United States Patent [19]
Levick

[11] 3,811,046
[45] May 14, 1974

[54] LIGHT SENSITIVE SECURITY SYSTEM

[75] Inventor: Herbert Levick, Wilton, Conn.

[73] Assignee: Le Van Electronics, Inc., Wilton, Conn.

[22] Filed: Jan. 22, 1973

[21] Appl. No.: 325,874

[52] U.S. Cl. .................................. 250/206, 250/209
[51] Int. Cl. ............................................. H01j 39/12
[58] Field of Search ........... 250/208, 209, 206, 214, 250/199; 307/311; 317/124; 315/155, 156

[56] References Cited
UNITED STATES PATENTS

| | | | |
|---|---|---|---|
| 3,704,374 | 11/1972 | Kaufman | 250/214 |
| 3,488,510 | 1/1970 | Raymond | 250/209 |
| 3,160,757 | 12/1964 | McAllise | 250/209 |
| 3,601,614 | 8/1971 | Platzer | 250/209 |
| 3,321,630 | 5/1967 | Durigi | 250/209 |
| 3,444,384 | 5/1969 | Horeczky | 250/209 |
| 3,423,633 | 1/1969 | Kawai | 250/208 |
| 3,400,270 | 9/1968 | Durig | 250/206 |
| 3,584,222 | 6/1961 | Nesbitt | 250/206 |

Primary Examiner—James W. Lawrence
Assistant Examiner—D. C. Nelms

[57] ABSTRACT

A light sensitive circuit for protection of an area is described. In a first embodiment, a single photocell is mounted together with a control circuit in a housing which fits in a conventional electrical wall box. The photocell is connected in a capacitor discharge circuit to enable a comparison amplifier to recognize whether the photocell is exposed to a normal ambient light change such as from night to daylight or to the beam from a flashlight. A pulse operated latching relay is used to effect a protective response when the photocell is suddenly exposed to a source of light. In an alternate embodiment for a light responsive protection circuit, a pair of photocells are used. One photocell is located to operate to control the enabling of a gate while the other photocell responds to a source of light to effect a desired protective response. A plurality of photocells may be accommodated.

6 Claims, 8 Drawing Figures

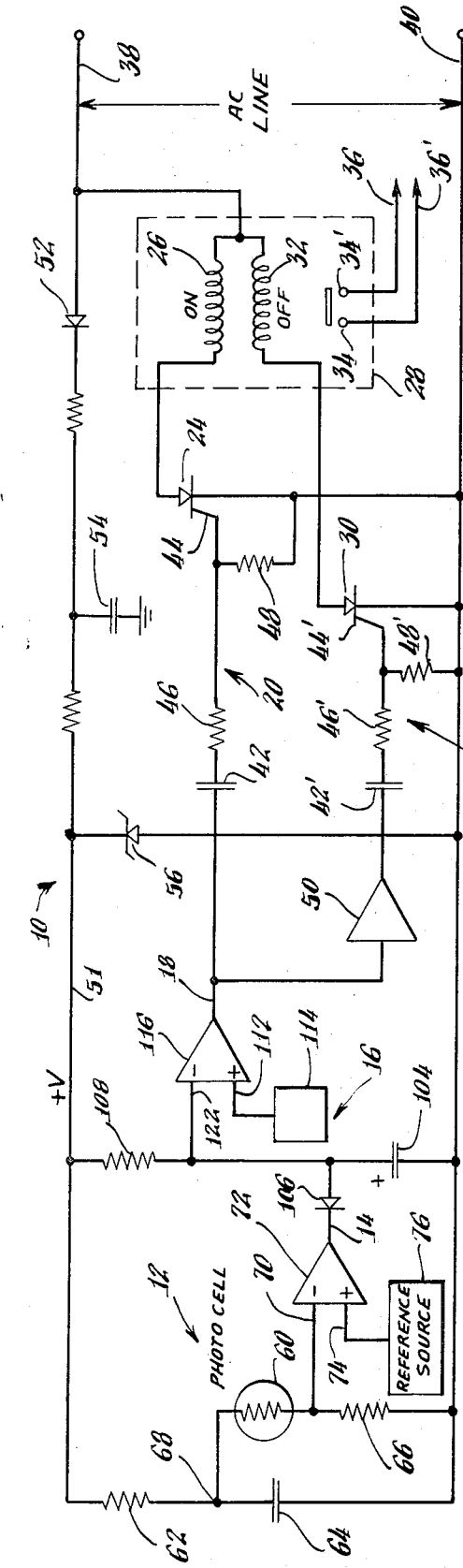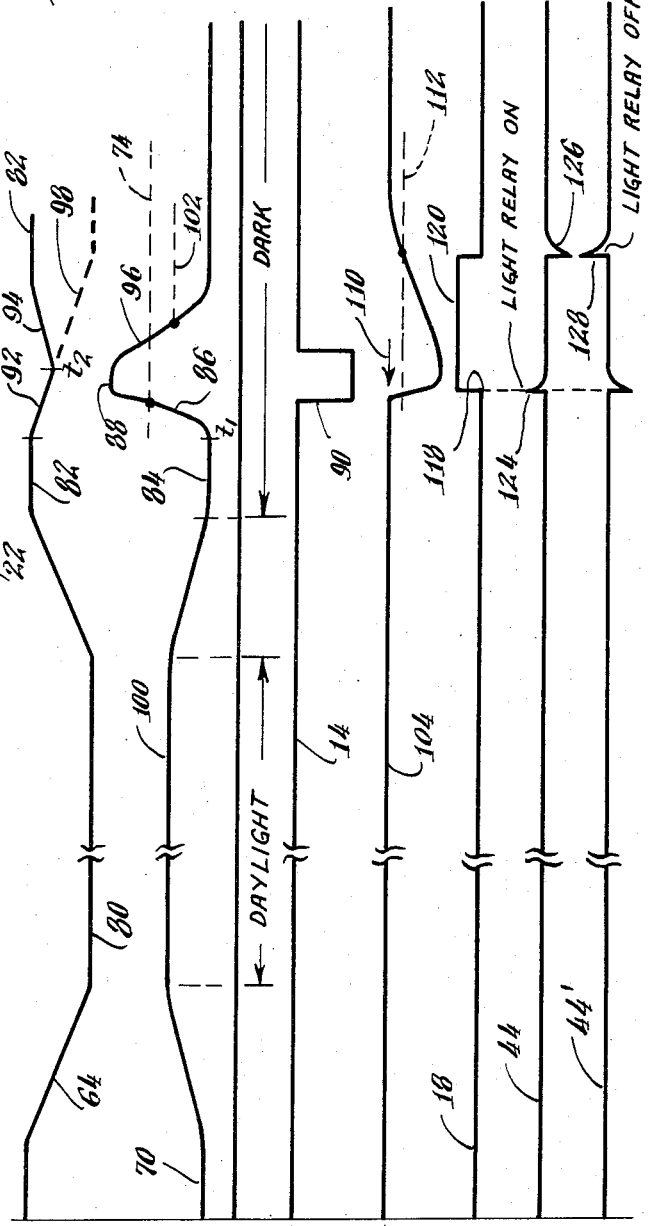

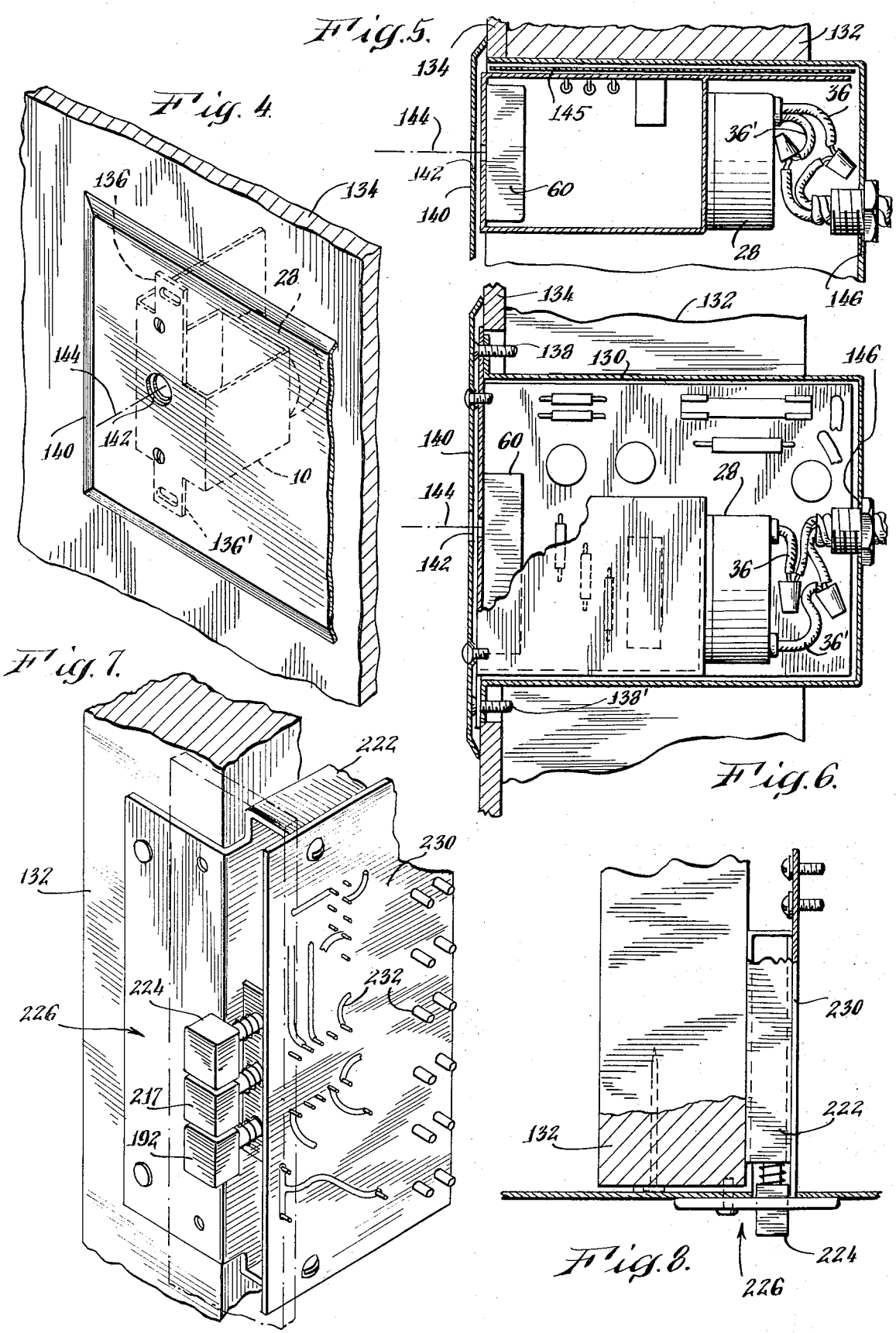

LIGHT SENSITIVE SECURITY SYSTEM

FIELD OF THE INVENTION

This invention relates to a light sensitive security system wherein a light sensitive detector initiates protective responses such as an alarm or electric illumination and the like. More specifically, this invention relates to a convenient detection circuit responding to illumination from an automobile headlight or a flashlight or the like.

BACKGROUND OF THE INVENTION

Light responsive devices are well known in a large variety of forms with different circuits and components. Note for example, the U.S. Pat. No. to Platzer, Jr. 3,601,614 in which a pair of photocells are connected in an electronic timing circuit to change the operation of an automotive rear view mirror in response to headlights from rear located traffic. One photocell senses ambient light to control activation of the apparatus, i.e., off during daylight hours and on at night time. The other photocell responds to rear traffic to cause a shift in the rear view mirror or when the light from headlights reach annoying levels. A turn on delay is shown in Platzer's FIGS. 3 and 4 to prevent circuit responses due to transient conditions.

Another photoelectric circuit is shown in U.S. Pat. to McAllise 3,106,757. The latter device also includes a pair of photoelectric sensors, one of which responds to ambient light conditions such as daylight and night time while the other responds to car headlights to turn garage lights on when an automobile approaches. A time delay is provided to hold the garage lights on for a predetermined time after initial circuit energization. A similar control circuit is disclosed in the U.S. Pat. No. to Worden 3,089,065 wherein one photocell compensates for ambient light conditions and another photocell is responsive to automobile headlights. A time delay is included to maintain exterior lights energized for a predetermined time period following circuit actuation. Other double photocell control devices are described in the U.S. Pat. Nos. to Corn 3,529,214, Kawai et al, 3,423,633 and Bischoff 1,911,986.

SUMMARY OF THE INVENTION

In a control circuit in accordance with the invention, a single photoconductor element may be employed to both compensate for ambient light conditions while responding to rapidly applied light signals to cause a protective response such as the turning on of a light or an alarm or the like. Thus, a single photocell is placed at a convenient location where one may exposed the cell to a triggering light beam to initiate a protective response. The photocell is connected in a circuit which distinguishes slowly varying light conditions, such as encountered when the ambient changes night time to day light, from rapid light fluctuations such as the sweep of a flashlight beam.

The single photocell protective circuit is particularly advantageous in that the cell may be exposed to ambient light conditions in the area sought to be protected without requiring the selective placement of a second photocell. The photocell may be located at any convenient spot where a night watchman, for example, may direct his flashlight beam before entering the protected area.

The single photocell is connected in a capacitive discharge circuit. A comparison amplifier is connected to the capacitive discharge circuit to produce an output pulse when the previously charged capacitor in the circuit is rapidly discharged to a new potential level by the drop in resistance of the illuminated photocell. The output pulse in turn initiates a timing circuit, which controls a relay coupled to a protective device such as an incandescent bulb. When the timing circuit times out, the relay is reset to extingush the incandescent bulb.

The light responsive control circuit is conveniently packaged to fit into a conventional wall switch box with the photocell exposed to the room through a central aperture in the box cover.

In an alternate form of a light responsive protective circuit in accordance with the invention, a pair of photocells is employed, one to compensate for ambient light and another to response to input light signals. This light responsive protective circuit may accommodate a plurality of input light signals from different light sensors. The circuit utilizes low input voltage output relays which are located at remote protected area locations to turn on lights or perform other protective tasks. The entire light responsive circuit may be conveniently mounted on a housing which fits between conventional studs in the wall of a house. The variety and number of sensors and controls provided with the light responsive circuit makes it particularly advantageous for use in the protection of homes.

It is, therefore, an object of the invention to provide a light responsive circuit for a protection system which may be conveniently mounted in a wall. It is a further object of the invention to provide an extensive light protective system wherein a convenient control of remotely located illuminating devices is obtained.

DETAILED DESCRIPTION OF DRAWINGS

These and other objects and advantages of the invention may be understood from the following description of several preferred embodiments described in conjunction with the drawings wherein FIG. 1 is a schematic of a single photocell light responsive protection circuit in accordance with the invention;

FIG. 2 is a waveform diagram of several waveforms generated in the circuit shown in FIG. 1;

FIG. 4 is a perspective view of a mounted wall socket circuit for a light responsive protection device as shown in FIG. 1;

FIG. 5 is a top plan view of the mounted wall socket mounted circuit shown in FIG. 4;

FIG. 6 is a side view in elevation of the wall socket mounted circuit shown in FIG. 4;

FIG. 7 is a perspective partially broken away view of a mounted light responsive protection circuit as illustrated with the schematic in FIG. 3; and FIG. 8 is a partial top view of the mounted circuit shown in FIG. 7.

DETAILED DESCRIPTION OF EMBODIMENTS

Figure 3:
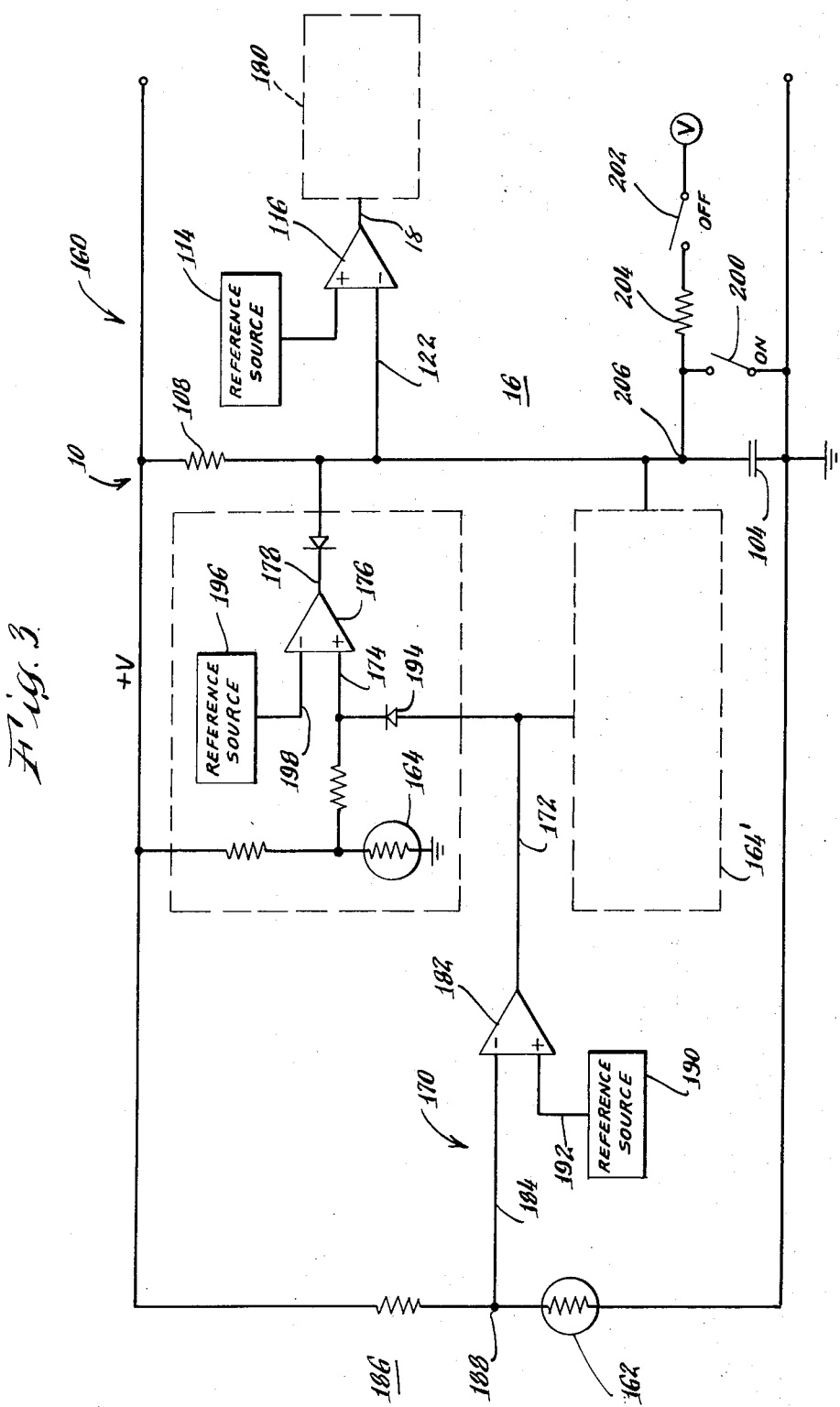
FIG. 3 is a schematic diagram of a multiple photocell light responsive circuit for protection of a home in accordance with the invention.

With reference to FIG. 1, a light sensitive protection circuit is shown with a light detection network 12 to respond to light illumination with an output pulse on output line 14. Output line 14 is applied to a timing network 16 to generate a time delay pulse on output line 18 of several minutes in duration.

The time delay pulse on line 18 is applied to a pair of trigger networks 20-22 which deliver power pulses respectively at the leading and trailing edges of the time delay pulse on line 18. Network 20 produces a positive power pulse in response to the leading edge of the time delay pulse on line 18 to turn on an SCR 24 connected in series with the ON coil 26 of a pulse operated latching relay 28. Network 22 provides a positive power pulse in response to the trailing edge of the time delay pulse on line 18. The power pulse from network 22 turns on an SCR 30 which is connected in series with an OFF coil 32 of latching relay 28.

Latching relay 28 is of conventional design and includes switch contacts such as 34—34' to control the power delivered to a load (not shown) through leads such as 36—36'. Both coils 26 and 32 are connected in series with SCRs 24, 30 respectively across AC power input lines 28, 40.

Networks 20, 22 each include a differentiating capacitor 42—42' to deliver spike pulses to control electrodes 44—44' of SCR's 24 and 30. Resistors 46—46' reduce the amplitude of the spikes delivered to the control electrodes while resistors 48—48' maintain one side of capacitors 42—42' discharged to ground line 40. Network 22 further includes a signal inverter 50, so that network 22 may operate in response to the trailing edge of the time delay pulse on line 18. DC power to drive circuit 10 is established between lines 51 and 40 from AC input power line 38, 40 with rectifier 52, filter 54 and a zener voltage reference diode 56.

A particular advantage of circuit 10 resides in the use of a single photocell 60 in network 12 for responding to light signals. Network 12 includes a series capacitor charging circuit formed of resistor 62 and capacitor 64 coupled across DC supply lines 51 and 40. A discharge circuit formed of series coupled photocell 60 and a resistor 66 is connected across capacitor 64. Photocell 60 links junction 68 to input line 70 of a comparison amplifier 72 having another input line 74 coupled to a reference potential source 76 such as a voltage divider network. Resistor 66 couples input line 70 to ground line 40 and with photocell 60 forms a light sensitive voltage divider for the voltage across capacitor 64.

When AC power is applied to circuit 10, capacitor 64 in network 12 charges to a voltage whose magnitude is determined by the voltage divider formed by resistor 62 and the series combination of photocell 60 and resistor 66. This charge potential varies as shown by the waveform 64 in FIG. 2 between a low level 80 during daylight and a high level 82 at night time. In between, i.e., during sunrise and dusk, the capacitor 64 is at a potential between these levels. At night time photocell 60 has a maximum resistance and the potential of input line 70 is at a low level 84 as shown in the waveform 70 in FIG. 2. When a light beam from a flashlight is swept at time $t_1$ across photocell 60, its resistance drops rapidly. Since the voltage level 82 across capacitor 64 cannot change as quickly, the potential of line 70 rises as shown by curve 86 to a maximum level 88 which is slightly less than the normal night time level 82 across capacitor 64 and greater than the voltage level of reference source 76. As input line 70 exceeds the voltage on line 74, a negative going output pulse 90 occurs on output line 14 of comparator 72.

Since the light beam is swept across photocell 64, the capacitor voltage level first drops as shown by waveform segment 92 until the light beam is removed at time $t_2$ after which the capacitor recharges along waveform 94 to level 82. Correspondingly, the voltage at input line 70 first increases to level 88 and then returns to the night or dark level 84 along waveform segment 96. In the event photocell 64 remains exposed to light, capacitor 64 would discharge to the light level 80 as shown by dotted line 98 and the potential on input line 70 would terminate at the daylight level 100 as shown by dotted line 102.

When comparator 72 produces output pulse 90, capacitor 104 in timing network 16 is rapidly discharged through diode 106. Capacitor 104 is normally charged by resistor 108 to a potential level 110 (see FIG. 2) above the reference level 112 applied by source 114. As a result, the output of comparator amplifier 116 remains at a negative level 118 until it produces a positive timing pulse 120 when capacitor 104 is discharged by pulse 90. Amplifier 116 has a high input resistance to reduce loading of capacitor 104.

Timing pulse 120 persists for as long as the voltage on capacitor 104 at input line 122 to comparator 116 remains less than reference 114. Hence, the charging time needed for capacitor 104, as determined by the time constant of resistor 108 and capacitor 104, sets the duration of timing pulse 120, i.e., of the order of several minutes.

Timer pulse 120 is passed through differentiator network 20 to deliver a positive spike 124 on control electrode 44 of SCR 24 to render the latter conductive. The duration of spike 124 is of sufficient length to assure that SCR 24 is forwardly biased for a sufficient time to drive a current pulse through coil 26 and set latch relay 28 in the "ON" position. When the AC line voltage reverses polarity across SCR 24, the latter is turned off. The negative going spike 126 has no effect on SCR 24.

In a similar manner, but at the trailing edge of timing pulse 120, a positive spike 128 is delivered to control electrode 44' of SCR 30 to render the latter conductive. This draws sufficient current through coil 32 to reset latch relay 28 in the "OFF" position. Operation of latching relay 28 thus enables remote power control through leads 36—36' of protective devices such as alarms, lights and the like.

As shown in FIGS. 4, 5 and 6, the single photocell circuit 10 of FIG. 1 is conveniently mounted in a conventional wall box 130 nailed to a wall stud 132 used in a building such as an office, store or residence. Thus, as shown in FIG. 4 where wall box housing 130 has been deleted for clarity, a wall panel 134 has an aperture through which the single photocell circuit 10 is mounted with conventional bracket strips 136—136' and screws 138—138'. A cover plate 140, having an aperture 142 in alignment with the light sensitive axis 144 of photocell 60, is mounted to bracket strips 136—136' and screws 138—138'. A cover plate 140, having an aperture 142 in alignment with the light sensitive axis 144 of the photocell 60, is mounted to bracket strips 136—136' to provide a neat appearance. Note how the entire circuitry 10 fits into a double wall socket housing 130 including relay 28 whose output leads 36—36' are connected to conventional house wires for control of an external device such as an incandescent or fluorescent light (not shown) or another relay. An insulator 145, such as heavy paper, is used to avoid shorting of electrical circuit elements.

In the embodiment 160 of FIG. 3, a pair of light sensitive elements 162 and 164 are used with element 162 employed as an ambient light sensor. Circuit 160 includes a multiple sensor carrying capability to accommodate a plurality of input light sensing elements and output responding latching relays.

Light responsive circuit 160 is particularly suitable for use in protecting a residential building where light sensing photocells 164 may be dispersed at suitable locations for the convenience of the user.

Ambient light sensing photocell 162 is located at a suitable place where ambient light may be sensed and is connected in a circuit 170 to provide a bias on output line 172 for enabling of circuit 160 during night time while disabling it during daylight.

The enabling output from ambient photocell 162 and the output from photocell 164 are combined at the input 174 of comparison amplifier 176. The output on line 178 of amplifier 176 drives a timing network 16 which produces a timing pulse such as 120 as in the embodiment of FIG. 1, of say several minutes duration on output line 18. The timing pulse on line 18 is applied and used in similar networks as described and disclosed with reference to FIG. 1 and as suggested by the dotted line 180.

Ambient light enabling signal producing circuit 170 includes a comparison amplifier 182 having one input 184 connected to a voltage divider 186 which is controlled by photocell 162. During daylight the resistance of photocell 162 is low causing the divider voltage at junction 188 to be below the reference voltage supplied by reference source 190 to the other input 192 of comparator 182. As a result, line 172 delivers a positive voltage through diode 194 onto input 174 to disable comparator 176.

At night the disabling voltage on line 172 is removed because junction 188 rises. A light beam incident upon photocell 164 produces a drop in the potential on input line 174 when the voltage on line 174 is less than that produced by reference 196 on input line 198 of comparator 176. Hence, an output pulse is delivered on line 178 to initiate a timing pulse as previously described.

A switch 200 is provided across capacitor 104 to enable manual initiation of network 160 by discharging capacitor 104. A switch 202 is provided in series with a DC voltage source resistor 104 and junction 206 to charge capacitor 104 and terminate operation of circuit 160.

The circuit 160 is conveniently mounted in a housing 222 as partially shown in FIG. 7. Housing 222 may be attached to a stud 132 with pushbuttons 217 and 224 for switches 200 and 202 protruding. Pushbutton 192 controls a switch (not shown) to switch in other remote controlled circuits as desired. The control coils of the relays are at remotely located points to thus allow control of protection devices such as lights and alarms with low voltage control leads. An insulative material such as heavy cardboard paper (not shown) similar to 145 of FIG. 5, is placed over housing 222 and its surface 230 to avoid accidental shorting of exposed low voltage conductors such as 232.

Having thus described light responsive protection circuits in accordance with the invention, its many advantages may be appreciated. Remote light beam energization of the circuit by a night watchman or policeman provides a convenient timed illumination of an area to be protected.

What is claimed is:

1. A light sensitive control circuit comprising
a source of DC power;
a series network formed of a first resistor and a capacitor, said series network being effectively coupled in series across the DC power source;
a series voltage divider network effectively coupled across the capacitor, said voltage divider network being formed of a first resistor and said light sensitive element;
a discharge circuit coupled to discharge the voltage retained by the capacitor, said discharge circuit including a light sensitive element which registers a change in resistance upon exposure to a source of light, said light sensitive element being coupled to vary the rate of discharge of the voltage charge on the capacitor in response to the rate of light exposure of the element; and
means coupled to the discharge circuit for producing an output signal when said rate of discharge exceeds a predetermined value representative of a predetermined variation of light incident upon the light sensitive element.

2. A light sensitive control circuit comprising
means including a capacitor for establishing a voltage charge on the capacitor;
a discharge circuit coupled to discharge the voltage retained by the capacitor, said discharge circuit including a light sensitive element which registers a change in resistance upon exposure to a source of light, said light sensitive element being coupled to vary the rate of discharge of the voltage charge on the capacitor in response to the rate of light exposure of the element;
a comparison amplifier having a pair of inputs with a first input coupled to the discharge circuit;
a voltage reference source coupled to the other input of the comparison amplifier, said voltage reference source having a voltage selected commensurate with a predetermined rate of discharge of the capacitor;
with the comparison amplifier providing an output pulse when the rate of discharge of the capacitor sensed at the first input exceeds the reference rate of discharge signal on the other input;
a timer network responsive to the output of the comparison amplifier for producing a timing pulse of a desired duration; and
means responsive to the timing pulse for delivering relay energizing pulses on separate lines at both the start and end of the timing pulse.

3. A light sensitive control for use in protection of an area comprising
a housing shaped and sized to fit within a wall switch socket mounting facing the area to be protected;
a light protection circuit mounted in the housing and having a light responsive variable resistive element oriented to face the area to be protected;
means including a capacitor for establishing a voltage charge on the capacitor;
a discharge circuit coupled to discharge the voltage retained by the capacitor, said discharge circuit including said light responsive element, said light responsive element being coupled to vary the rate of discharge of the capacitor in response to the rate of light exposure of said element; and means coupled to the discharge circuit for producing an output signal when said rate of discharge exceeds a predetermined value representative of a minimum variation of light incident upon the light sensitive element said output signal producing means including a pulse responsive latching relay mounted to the housing, said relay being provided with output leads for actuation of external devices.

4. The light sensitive control as claimed in claim 3 wherein the output signal producing means further includes a timing circuit for producing a timing pulse upon the incidence of light in excess of a predetermined rate; and means for producing relay latching and unlatching pulses respectively at the beginning and end of the timing pulse for control of the relay.

5. A light controlled apparatus for generating timed energization of a safety device comprising means including a first light sensing element for generating a control signal representative of the occurrence of daylight and darkness;

a signal gate having an enabling input coupled to the control signal, said signal gate being disabled when the control signal is representative of daylight;

a second light sensing element coupled to the signal gate to produce an output signal therefrom when said second light sensing element is exposed to light;

a timing circuit coupled to the output of the signal gate to generate a timing pulse of predetermined duration when said first light sensing element is exposed to darkness and said second light sensing element is exposed to light;

the timing circuit further including a timing capacitor and a timing resistor coupled to charge the capacitor at a desired controlled rate; a high input resistance circuit coupled to the timing capacitor and operative below a predetermined charge level of the timing capacitor to produce said timing pulse until the timing resistor has charged the timing capacitor below said predetermined charge level; and means for producing separate pulses on separate leads at respectively the beginning and end of the timing pulse to energize said safety device, said means for producing said separate pulses further including a pulse responsive latching relay having a pair of control coils for respectively latching and unlatching of the relay, said control coils being coupled to said separate pulses.

6. The light controlled apparatus as claimed in claim 5 wherein the separate pulses producing means further includes a signal inverter driven by the timing pulse and a pair of semiconductor elements coupled to the timing pulse and the signal inverter, said semiconductor elements being coupled to the relay latching and unlatching coils to implement relay control by the timing pulse.

* * * * *